United States Patent
Shih

(10) Patent No.: US 11,598,363 B2
(45) Date of Patent: Mar. 7, 2023

(54) LOW-WEAR SCREW STRUCTURE

(71) Applicant: BI-MIRTH CORP., Kaohsiung (TW)

(72) Inventor: Yi-Chieh Shih, Kaohsiung (TW)

(73) Assignee: BI-MIRTH CORP., Kaohsiung (TW)

( * ) Notice: Subject to any disclaimer, the term of this patent is extended or adjusted under 35 U.S.C. 154(b) by 351 days.

(21) Appl. No.: 17/029,901

(22) Filed: Sep. 23, 2020

(65) Prior Publication Data

US 2022/0090621 A1    Mar. 24, 2022

(51) Int. Cl.
*F16B 25/10* (2006.01)
*F16B 25/00* (2006.01)

(52) U.S. Cl.
CPC ........ *F16B 25/103* (2013.01); *F16B 25/0015* (2013.01); *F16B 25/0047* (2013.01); *F16B 25/10* (2013.01)

(58) Field of Classification Search
CPC .. F16B 25/00; F16B 25/0015; F16B 25/0031; F16B 25/0047; F16B 25/0052; F16B 25/0057; F16B 25/10; F16B 25/103
USPC ............. 411/386, 387.1, 387.2, 387.3–387.5
See application file for complete search history.

(56) References Cited

U.S. PATENT DOCUMENTS

| | | | |
|---|---|---|---|
| 6,328,516 B1* | 12/2001 | Hettich | F16B 25/103 411/311 |
| 9,850,935 B2* | 12/2017 | Shih | F16B 25/103 |
| 2006/0285940 A1* | 12/2006 | Walther | F16B 25/0068 411/421 |
| 2008/0286072 A1* | 11/2008 | Stiebitz | F16B 25/0073 411/387.5 |
| 2013/0039720 A1* | 2/2013 | Shih | F16B 25/0047 411/387.4 |
| 2015/0063946 A1* | 3/2015 | Park | F16B 25/0068 411/386 |
| 2015/0184685 A1* | 7/2015 | Su | F16B 25/103 411/387.2 |
| 2017/0284447 A1* | 10/2017 | Falkenstein | F16B 23/003 |
| 2017/0343029 A1* | 11/2017 | Hsu | F16B 25/0052 |
| 2018/0266467 A1* | 9/2018 | Lin | F16B 25/0026 |

* cited by examiner

*Primary Examiner* — Roberta S Delisle
(74) *Attorney, Agent, or Firm* — Muncy, Geissler, Olds & Lowe, P.C.

(57) ABSTRACT

The invention provides a low-wear screw structure which comprises a screw head, a rod body, a first thread and at least a crushing rib, wherein the rod body extending out from the screw head and being successively formed with a rod extension part, a reaming part and a taper part, the first thread being annularly arranged on an outer peripheral surface of the rod body at a distance from the taper part to the rod extension part through the reaming part, the crushing ribs being arranged on the rod body at the reaming part, wherein a first included angle is formed between the first side surface and the outer peripheral surface of the rod body, a second included angle is formed between the second side surface and the outer peripheral surface of the rod body, and the first included angle is different from the second included angle.

10 Claims, 10 Drawing Sheets

LOW-WEAR SCREW STRUCTURE

FIELD OF THE INVENTION

The invention relates to a screw, in particular to a low-wear screw structure capable of reaming and reducing thread wear.

BACKGROUND OF THE INVENTION

When the wood screw is locked into the wood, the wood with higher hardness has high density and strong resistance, and the friction force between the screw teeth of the wood screw and the wood block is gradually increased in the screwing process, so that the wood screw needs more and more force to be locked into the wood. Therefore, the abrasion of the screw teeth is easy to occur, and the wood screw is unfavorably locked into the wood. The wood screw also needs more and more force to be locked into the wood, and the wood crack is easy to occur. Accordingly, there is a need for a solution to these problems.

SUMMARY OF THE INVENTION

Accordingly, there is a need for a solution to these problems.

In order to achieve the purpose, the invention provides a low-wear screw structure mainly including: a screw head comprising a top and a neck extending from the top and tapering away from the top; a rod body extending from the neck of the screw head, wherein the rod body comprises a rod extension part connected to the neck, a reaming part connected to the rod extension part and a taper part connected to an other side of the reaming part, wherein the rod extension part is provided with a first bottom diameter, and the reaming part is provided with a second bottom diameter; a first thread annularly arranged on an outer peripheral surface of the rod body at a distance from the taper part to the rod extension part through the reaming part; and at least a crushing rib, the crushing rib being arranged on the outer peripheral surface of the rod body at the reaming part, each crushing rib being provided with a first side surface and a second side surface; the first thread at the reaming part being provided with a plurality of sawtooth cutting edges at an outer periphery; a first included angle being formed between the first side surface of each crushing rib and the outer peripheral surface of the rod body at a cross section of the crushing rib and the rod body, a second included angle being formed between the second side surface of each crushing rib and the outer peripheral surface of the rod body at a cross section of the crushing rib and the rod body, and the first included angle being different from the second included angle.

Further, a diameter width of the first bottom diameter of the rod extension part is different from a diameter width of the second bottom diameter of the reaming part, and the diameter width of the second bottom diameter is greater than zero and smaller than the diameter width of the first bottom diameter.

Further, the first thread has a first height at the rod extension part and the first thread has a second height at the reaming part, the first height being different from the second height, the first height being greater than zero and less than the second height.

Further, the first thread has a first thread outer diameter width that is the same as the reaming part at the rod extension part.

Further, each crushing rib is spirally disposed on an outer peripheral surface of the reaming part of the rod body in a direction parallel to an axis of the rod body, and an angle value of the first included angle is greater than an angle value of the second included angle.

Further, a third included angle is formed between the first side surface of each crushing rib and the outer peripheral surface of the first thread on the reaming part of the rod body, the third included angle being less than 90 degrees and greater than zero degree.

Further, each crushing rib is provided with a ridge portion formed at a junction of the first side surface and the second side surface, the ridge portion having an arc shape in cross section.

Further, a difference between the first included angle and the second included angle is greater than or equal to 5 degrees and less than or equal to 45 degrees.

Further, the first thread has a first thread angle at the reaming part and the first thread has a second thread angle at the taper part, an angle of the first thread angle being different from an angle of the second thread angle.

Further, each crushing rib is provided with a ridge portion provided with a plurality of peaks and a plurality of valleys which are alternately arranged so that the ridge portion is wavy.

Therefore, compared with the prior art, the invention has the following beneficial effects:

1, According to the low-wear screw structure of the present disclosure, the first included angle and the second included angle of the crushing rib are different, and the angle value of the first included angle is greater than the angle value of the second included angle, so that sawdust between threads of the crushing rib can be rapidly broken when the crushing rib is locked into wood, the screwing-in torque force when the first thread is locked is reduced, and the wear generated when the first thread is locked is reduced.

2, According to the first thread of the present disclosure, the diameter width of the first bottom diameter of the rod extension part is different from the diameter width of the second bottom diameter of the reaming part, so that the outer diameter width of the first thread of the first thread is the same as that of the rod extension part and the reaming part, and an operator can lock the first thread into wood easily.

DETAILED DESCRIPTION OF THE PREFERRED EMBODIMENTS

Reference will now be made in detail to the preferred embodiments for the technical features and modes of operation of the present application, examples of which are illustrated in the accompanying drawings for review. Moreover, the drawings are not necessarily drawn to scale in order to facilitate explanation, and are not intended to limit the scope of the invention for protection.

Figure 1:
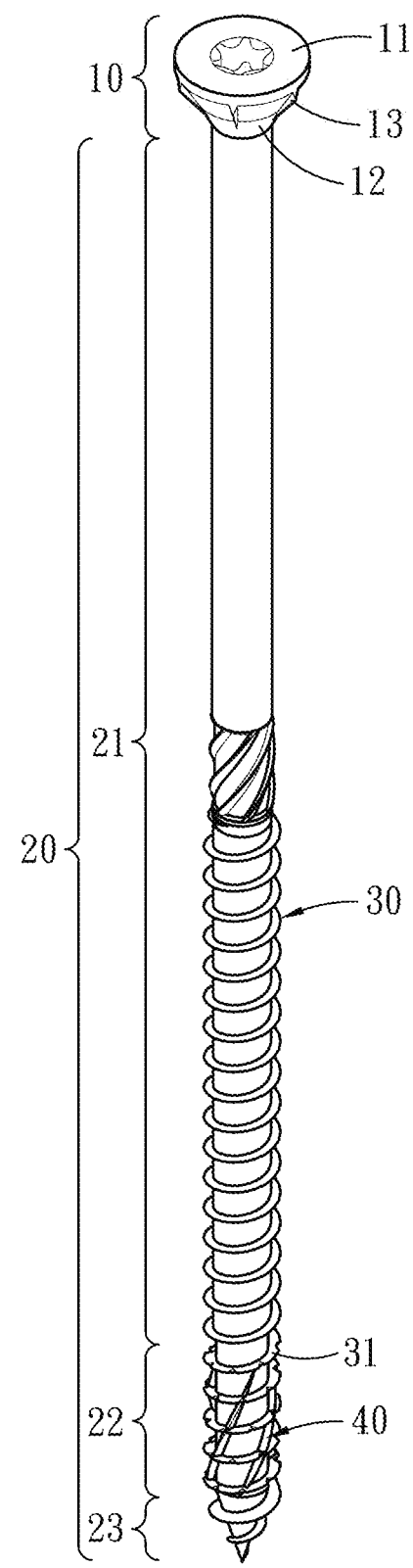
FIG. 1 is a three-dimensional schematic view of a first embodiment of a low-wear screw structure of the present disclosure.

With regard to the technology of the present disclosure, with reference to FIGS. 1-3, the present disclosure provides a first embodiment of a low-wear screw structure consisting essentially of a screw head 10, a rod body 20, a first thread 30 and at least a crushing rib 40. The low-wear screw structure of the present disclosure is primarily, but not exclusively, useful for securing or engaging wooden workpieces, such as wooden floors, wooden furniture, and the like.

The screw head 10, as shown in FIG. 1 to FIG. 3B, comprises a top 11 and a neck 12 extending from the top 11 and tapering away from the top 11, the neck 12 being provided with a plurality of ribs 13 which, when locked into a wooden workpiece, enhance the embedability with the wooden workpiece.

Figure 3A:
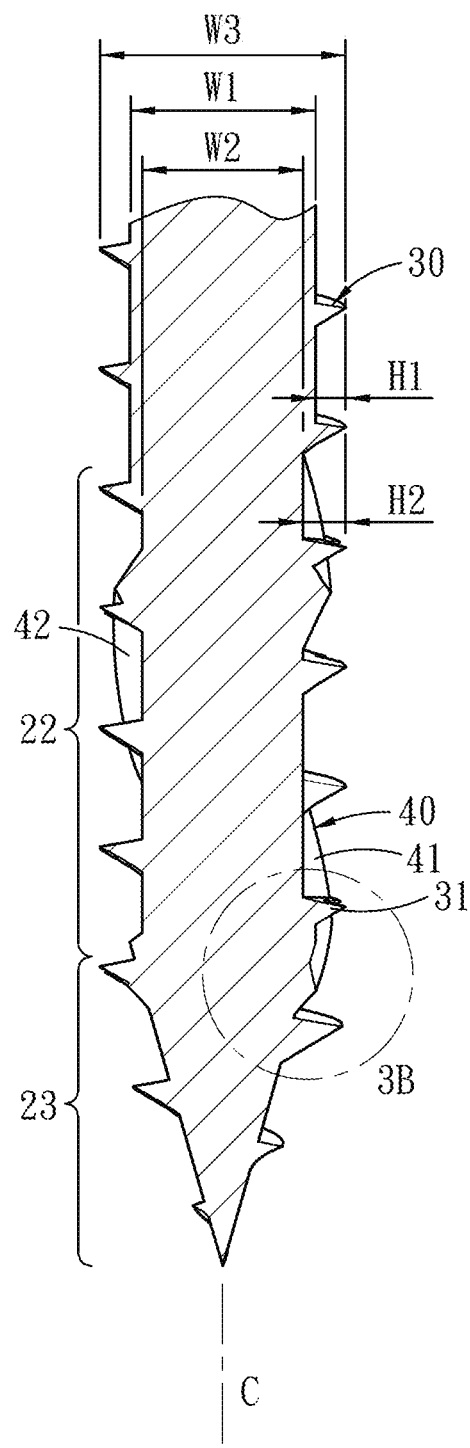
FIG. 3A is a schematic cross-sectional view of the circle of FIG. 2A.

The rod body 20 extends from the neck 12 of the screw head 10 and includes a rod extension part 21 connected to the neck 12, a reaming part 22 connected to the rod extension part 21, and a taper part 23 connected to an other side of the reaming part 22. With reference to FIG. 3A, the rod extension part 21 has a first bottom diameter W1, and the reaming part 22 has a second bottom diameter W2, wherein a diameter width of the first bottom diameter W1 of the rod extension part 21 is different from a diameter width of the second bottom diameter W2 of the reaming part 22, and the diameter width of the second bottom diameter W2 is greater than zero and smaller than the diameter width of the first bottom diameter W1.

The first thread 30 is annularly arranged on an outer peripheral surface of the rod body 20 at a distance from the taper part 23 to the rod extension part 21 through the reaming part 22, wherein the first thread 30 has a first height H1 at the rod extension part 21, and the first thread 30 has a second height H2 at the reaming part 22. The first height H1 is different from the second height H2 and the first height H1 is greater than zero and less than the second height H2, and the first thread 30 has a first thread outer diameter width W3, and the first thread outer diameter width W3 of the rod extension part 21 and the first thread outer diameter width W3 of the reaming part 22 are the same. That is, the first thread outer diameter width W3 at the rod extension part 21 and the first thread outer diameter width W3 at the reaming part 22 are the same. In the first embodiment, the rod body 20 is provided with one first thread 30, and the body 20 may be provided with no less than two first threads 30, without limitation. In addition, the first thread 30 has a first thread angle β1 at the reaming part 22 with the reaming part, and the first thread 30 has a second thread angle β2 at the taper 23. An angle of the first thread angle β1 is different from an angle of the second thread angle β2, wherein the first thread angle β1 is between about 30 degrees and 50 degrees, the first thread angle β1 of the first embodiment being 40 degrees, and the second thread angle β2 is between about 40 degrees and 60 degrees, the second thread angle β2 of the first embodiment being 50 degrees. The first thread 30 has an asymmetric structure.

Figure 2A:
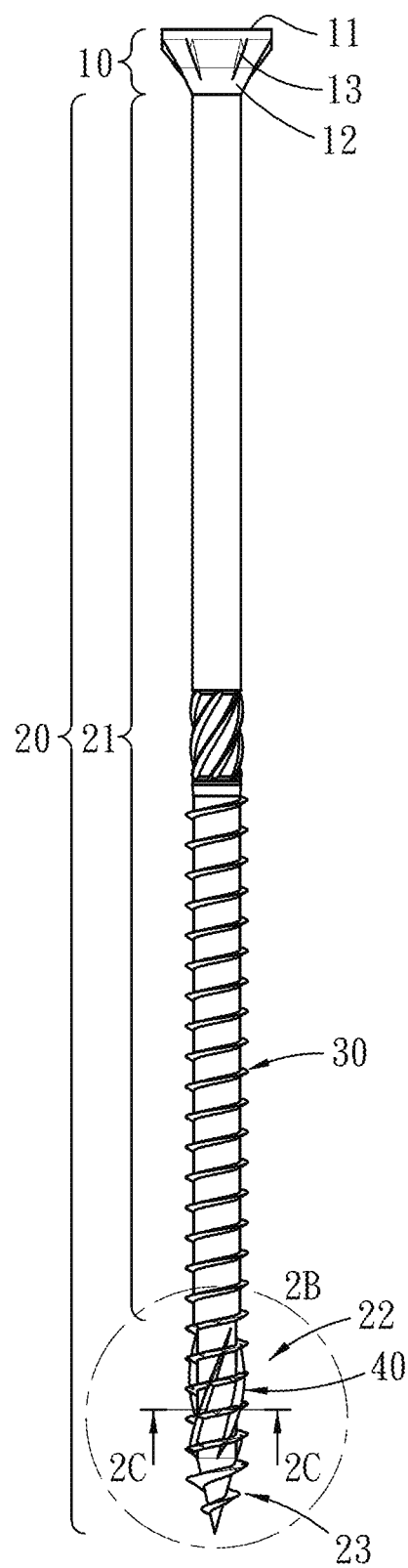
FIG. 2A is a schematic side view of the first embodiment of the low-wear screw structure of the present disclosure.
Figure 2B:
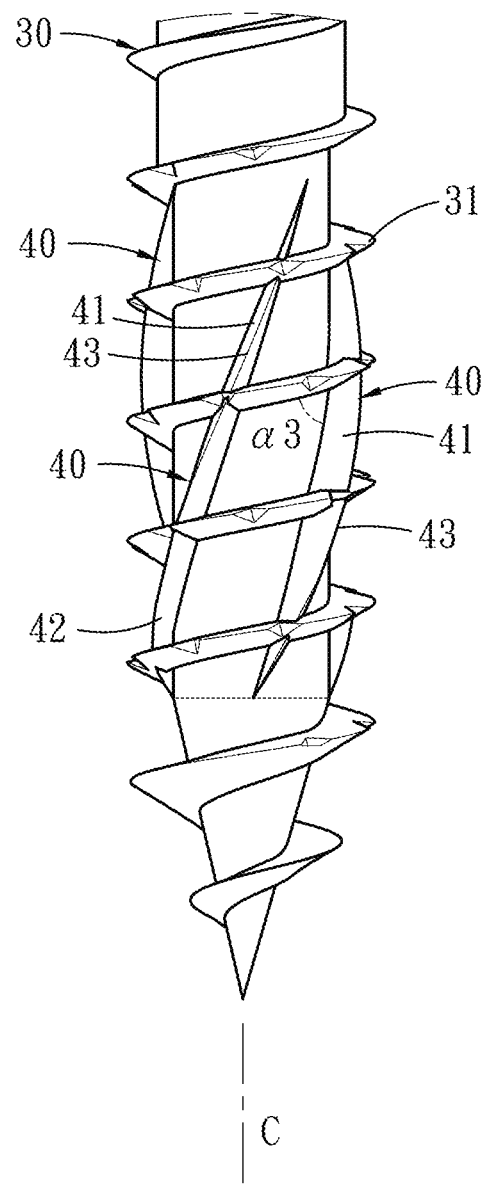
FIG. 2B is an enlarged partial view of the circle of FIG. 2A.
Figure 2C:
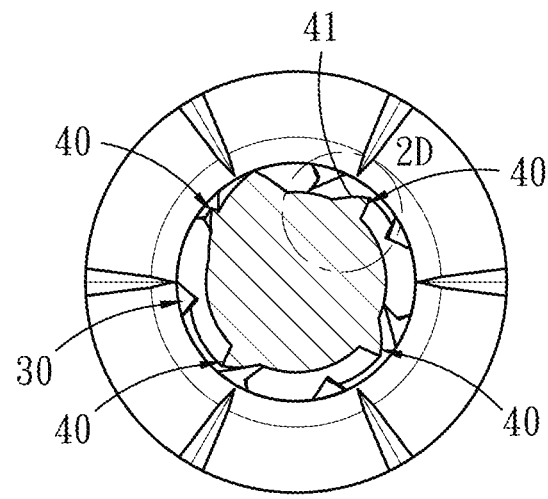
FIG. 2C is a schematic cross-sectional view taken along line 2C-2C of FIG. 2A.
Figure 2D:
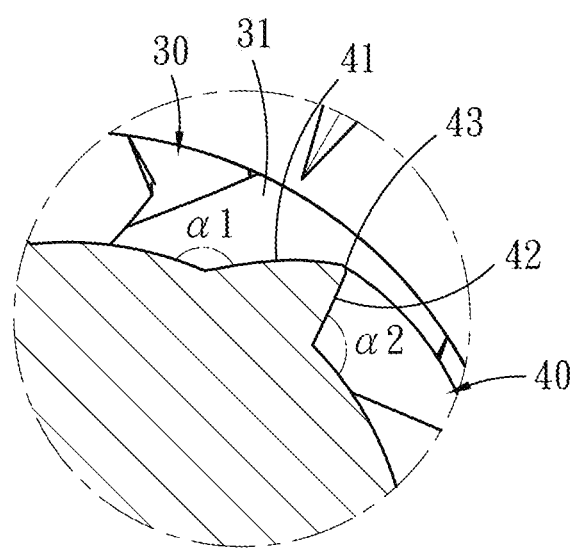
FIG. 2D is a partially enlarged view of the circle of FIG. 2C.
Figure 3B:
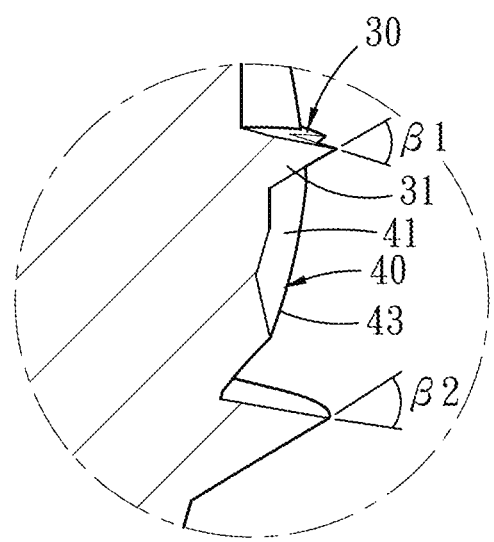
FIG. 3B a partially enlarged view of the circle of FIG. 3A.

The crushing ribs 40 are provided on the outer peripheral surface of the rod body 20 at the reaming part 22. As shown in FIG. 2B to FIG. 2D, the first embodiment has four crushing ribs 40, each of which has a first side surface 41, a second side surface 42 and a ridge portion 43 formed at the junction of the first side surface 41 and the second side surface 42. Each crushing rib 40 is spirally arranged on the outer peripheral surface of the reaming part 22 of the rod body 20 in a direction C parallel to an axis of the rod body 20, and the cross section of the ridge portion 43 has an arc shape, but is not limited thereto.

With regard to the third embodiment of the low-wear screw structure of the present disclosure, the first thread 30 at the reaming part 32 is provided with a plurality of saw-tooth cutting edges 31 at the outer periphery thereof, and the saw-tooth cutting edges 31 enable the reaming part 22 thereof to easily ream the wood workpiece when locked.

Figures 4A, 4B:
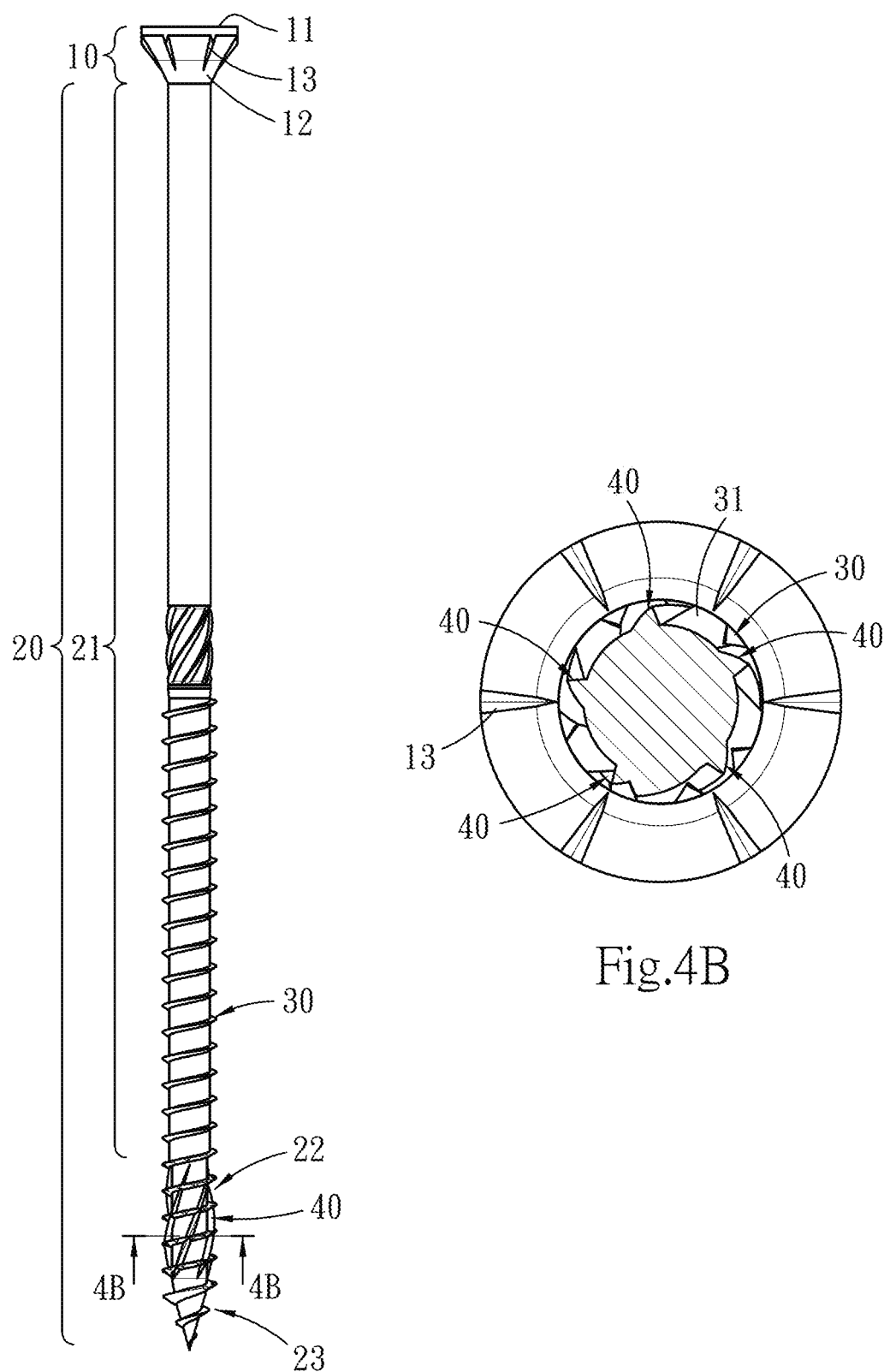
FIG. 4A is a schematic side view of a second embodiment of the low-wear screw structure of the present disclosure.
FIG. 4B is a schematic cross-sectional view taken along line 4B-4B of FIG. 4A.
Figure 5A:
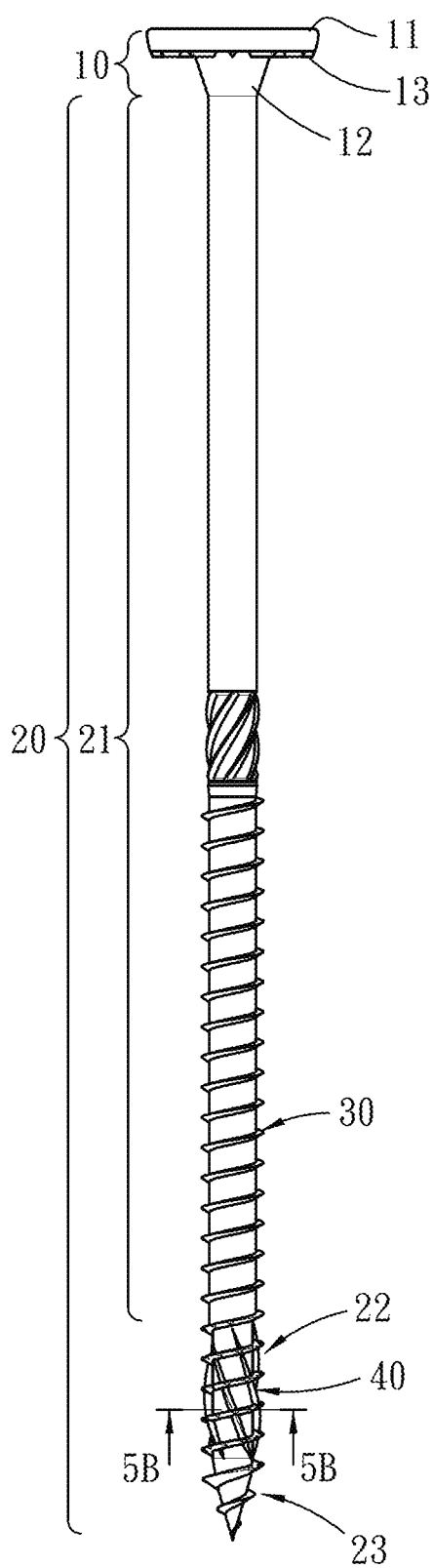
FIG. 5A is a schematic side view of a third embodiment of the low-wear screw structure of the present disclosure.
Figure 5B:
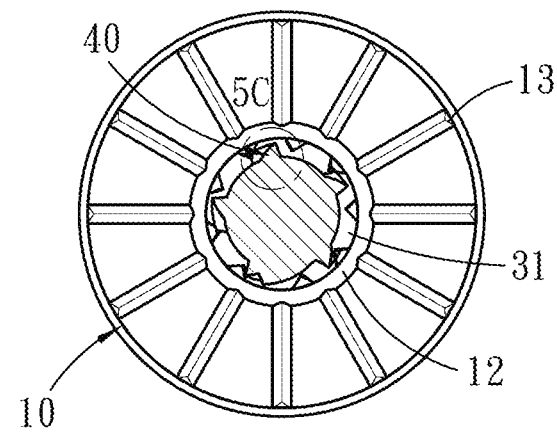
FIG. 5B is a schematic cross-sectional view taken along line 5B-5B of FIG. 5A.
Figure 5C:
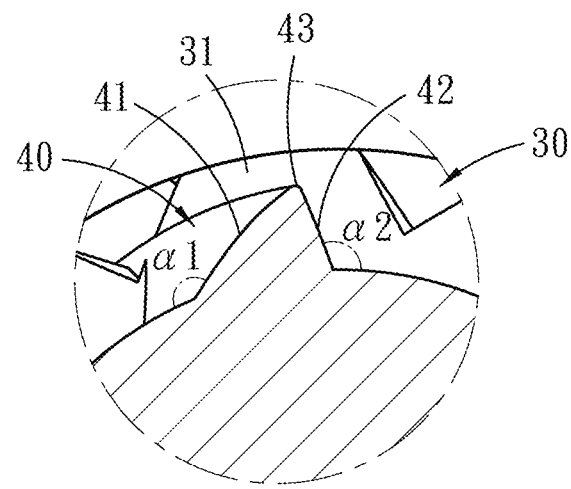
FIG. 5C is an enlarged schematic view of the circle of FIG. 5B.
Figure 6:
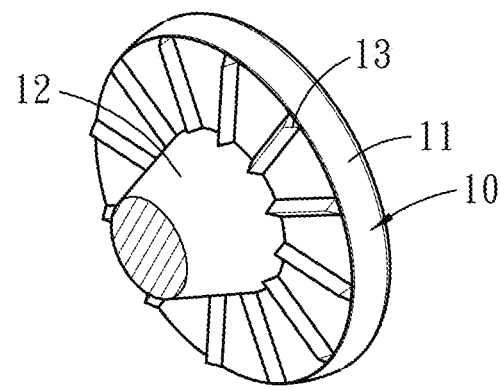
FIG. 6 is a partially enlarged perspective view of the screw head of FIG. 5A.

Here, again with reference to FIG. 2C and FIG. 2, a first included angle α1 is formed between the first side surface 41 of each crushing rib 40 and the outer peripheral surface of the rod body 20 form at the cross section of the crushing rib 40 and the rod body 20. A second included angle α2 is formed between the second side surface 42 of each crushing rib 40 and the outer peripheral surface of the rod body 20 at the cross section of the crushing rib 40 and the rod body 20. The first included angle α1 is different from the second included angle α2, and the difference value between the first included angle α1 and the second included angle α2 is greater than or equal to 5 degrees, and less than or equal to 45 degrees. In the first embodiment, the difference between the first included angle α1 and the second included angle α2 is approximately 15 degrees, and the angle value of the first included angle α1 is greater than the angle value of the second included angle α2. The angle value of the first included angle α1 is between 30 degrees and 80 degrees, while the angle value of the second included angle α2 is between 5 and 30 degrees, whereby the generated chips are not easily accumulated at the reaming part 22 and can be quickly discharged and the wear of the first thread 30 is reduced as shown in FIG. 2B. Each crushing rib 40 is tapered to the rod body 20 at both ends.

with reference to FIG. 4A to FIG. 4B, there is shown a second embodiment of the present disclosure, the main features and functions of which are the same as those of the first embodiment, and the main difference is that the second embodiment forms five crushing ribs 40 on the reaming part 22. A third included angle α3 is formed between the first side surface 41 of each crushing rib 40 and the outer peripheral surface of the first thread 30 at the reaming part 22 of the rod body 20, the third included angle α3 being less than 90 degrees and greater than zero degree. In addition, a user can form two crushing ribs 40, three crushing ribs 40, four crushing ribs 40, five crushing ribs 40, six crushing ribs 40, seven crushing ribs 40, eight crushing ribs 40 and the like on the outer peripheral surface of the reaming part 22 as required, without limitation. Further, a user may also provide an oblique thread (not numbered) on the outer peripheral surface of the rod extension part 21 between the first thread 30 and the neck 12 according to his or her needs, without affecting the structure and the resulting efficacy of the crushing rib 40 of the present disclosure.

with reference to FIG. 5A to FIG. 6, there is shown a third embodiment of the present disclosure, the main features and functions of which are the same as those of the first embodiment and will not be described in detail. The main difference is that each crushing rib 40 of the reaming part 21 of the third embodiment is spirally arranged in an axial direction C of the rod body 20 in a counterclockwise direction. That is, the arrangement directions of the crushing ribs 40 and the rotation of the first thread 30 in the axial direction C of the rod body 20 are different, so that the third included angle α3 formed by the first side surface 41 of each crushing rib 40 and the outer peripheral surface of the first thread 30 on the reaming part 22 of the rod body 20 is greater than 90 degrees and less than 180 degrees.

Figure 7:
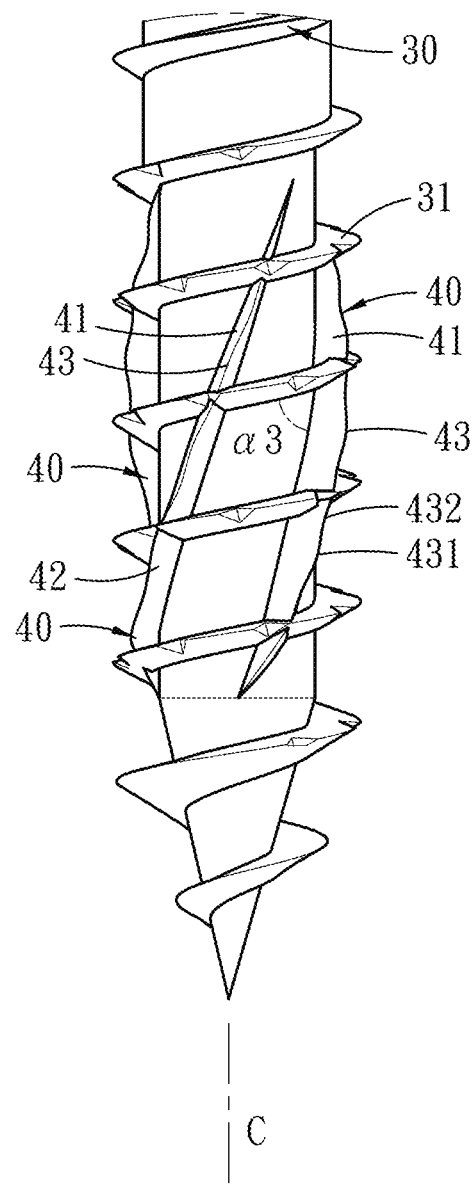
FIG. 7 is a partial side view of the rod body of a fourth embodiment of the low-wear screw structure of the present disclosure.

With reference to FIG. 7, there is shown a fourth embodiment of the present disclosure, the main features and functions of which are the same as those of the first embodiment and will not be described in detail. The main difference is that the ridge portion 43 of each crushing rib 40 of the fourth embodiment is provided with a plurality of peaks 431 and valleys 432 which are alternately arranged, and both ends of each crushing rib 40 are tapered to the rod body 20. The ridge portions 43 of each crushing ribs 40 are wavy so as to facilitate crushing and removal of chips generated.

Figure 8:
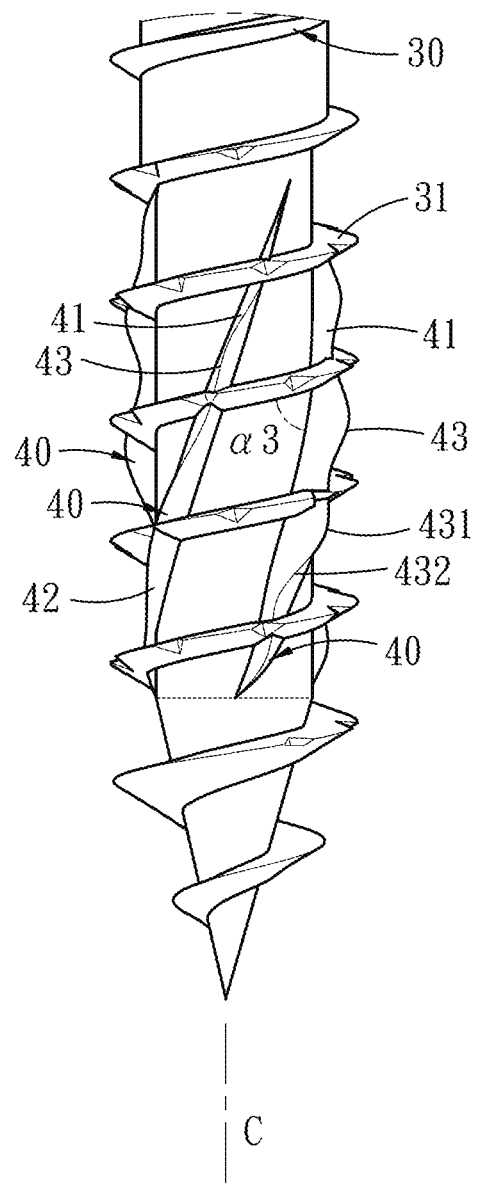
FIG. 8 is a partial side view of the rod body of a fifth embodiment of the low-wear screw structure of the present disclosure.

With reference to FIG. 8, there is shown a fifth embodiment of the present disclosure, the main features and functions of which are the same as those of the first embodiment and will not be described in detail. The main difference is that the ridge portion 43 of each crushing rib 40 of the fourth embodiment is provided with peaks 431 and valleys 432 which are alternately arranged. The height difference between the peaks 431 and the valleys 432 of the fifth embodiment is greater than the height difference between the peaks 431 and the valleys 432 of the fourth embodiment, whereby the ridge portions 43 of each crushing rib 40 are wavy to also facilitate crushing and removal of chips generated.

Figure 9:
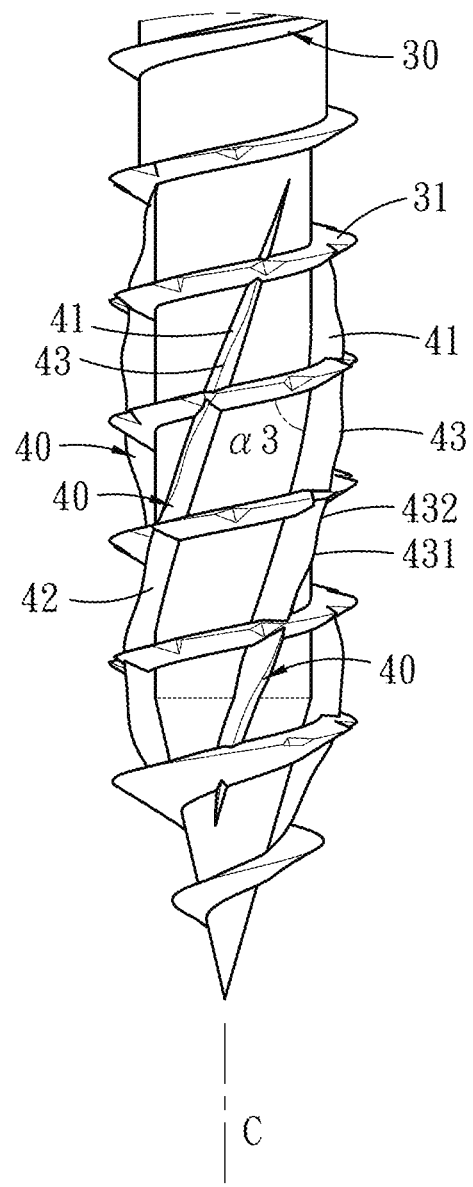
FIG. 9 is a partial side view of the rod body of a sixth embodiment of the low-wear screw structure of the present disclosure.

With reference to FIG. 9, there is shown a sixth embodiment of the present disclosure, the main features and functions of which are the same as those of the first embodiment and will not be described in detail. The main difference is that the ridge portion 43 of each crushing rib 40 of the sixth embodiment is provided with a plurality of peaks 431 and valleys 432 which are arranged alternately, and both ends of each crushing rib 40 are tapered to the rod body 20. The ridge portion 43 of each crushing rib 40 is wavy to facilitate crushing and removal of chips generated, and the crushing rib 40 extends to the taper part 23 so that generated chips are removed from the taper part 23.

Figure 10:
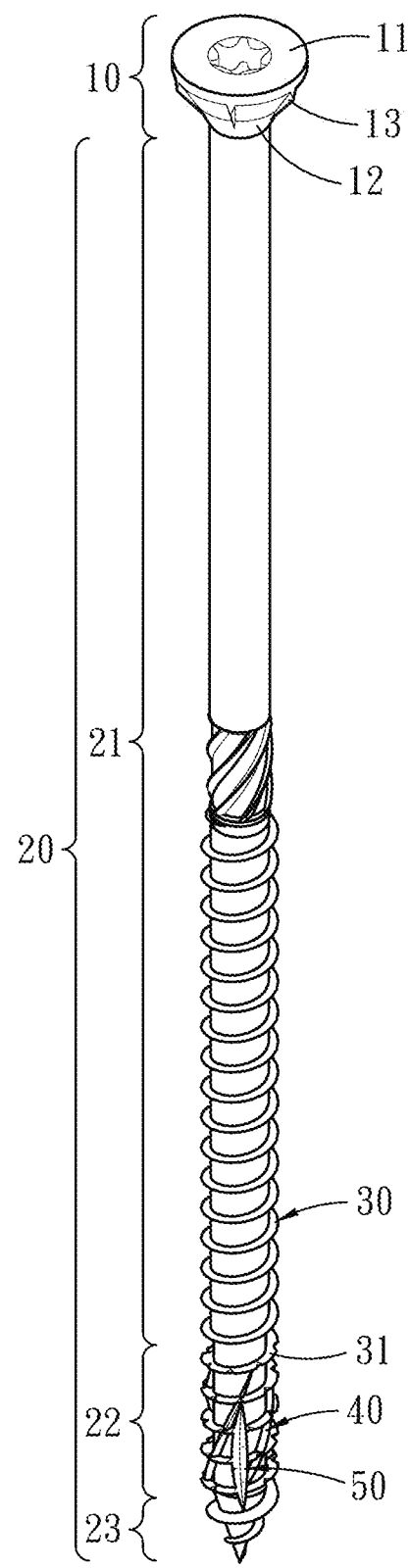
FIG. 10 is a three dimensional schematic view of a seventh embodiment of the low-wear screw structure of the present disclosure.

With reference to FIG. 10, there is shown a seventh embodiment of the present disclosure, the main features and functions of which are the same as those of the first embodiment and will not be described in detail. The main difference is that the ridge portion 43 of each crushing rib 40 of the seventh embodiment is provided with a plurality of peaks 431 and valleys 432 which are arranged alternately. The ridge portion 43 of each crushing rib 40 is wavy so as to facilitate crushing and removal of chips generated, and a quick chip removal groove 50 is formed at the reaming part 22 so that chips generated by the crushing process can be quickly discharged through the quick chip removal groove 50.

In summary, the first included angle α1 and the second included angle α2 of each crushing rib 40 of the low-wear screw structure of the present disclosure are different and the first included angle α1 is greater than the second included angle α2, so that chips located between the first threads 30 can be easily broken and crushed when a wooden workpiece is locked in. The torque force screwed in when the first threads 30 are locked is reduced, so that the abrasion of the first threads 30 can be reduced. Meanwhile, the first thread 30 is designed such that the first thread outer diameter width W3 of the first thread 30 is the same as that of the rod extension part 21 and the reaming part 22 with the diameter width of the first bottom diameter W1 of the rod extension part 21 being different from the diameter width of the second bottom diameter W2 of the reaming part 22, thereby allowing an operator to lock a wooden workpiece with little effort.

What is claimed is:

1. A low-wear screw structure including:
   a screw head comprising a top and a neck extending from the top and tapering away from the top;
   a rod body extending from the neck of the screw head, wherein the rod body comprises a rod extension part connected to the neck, a reaming part connected to the rod extension part and a taper part connected to an other side of the reaming part, wherein the rod extension part is provided with a first bottom diameter, and the reaming part is provided with a second bottom diameter;
   a first thread annularly arranged on an outer peripheral surface of the rod body at a distance from the taper part to the rod extension part through the reaming part; and
   at least a crushing rib, the crushing rib being arranged on the outer peripheral surface of the rod body at the reaming part, each crushing rib being provided with a first side surface and a second side surface;
   wherein the first thread at the reaming part being provided with a plurality of sawtooth cutting edges at an outer periphery;
   wherein a first included angle being formed between the first side surface of each crushing rib and the outer peripheral surface of the rod body at a cross section of the crushing rib and the rod body, a second included angle being formed between the second side surface of each crushing rib and the outer peripheral surface of the rod body at a cross section of the crushing rib and the rod body, and the first included angle being different from the second included angle.

2. The low-wear screw structure of claim 1, wherein a diameter width of the first bottom diameter of the rod extension part is different from a diameter width of the second bottom diameter of the reaming part, and the diameter width of the second bottom diameter is greater than zero and smaller than the diameter width of the first bottom diameter.

3. The low-wear screw structure of claim 2, wherein the first thread has a first height at the rod extension part and the first thread has a second height at the reaming part, the first height being different from the second height, the first height being greater than zero and less than the second height.

4. The low-wear screw structure of claim 2, wherein the first thread has a first thread outer diameter width that is the same as the reaming part at the rod extension part.

5. The low-wear screw structure of claim 1, wherein each crushing rib is spirally disposed on an outer peripheral surface of the reaming part of the rod body in a direction parallel to an axis of the rod body, and an angle value of the first included angle is greater than an angle value of the second included angle.

6. The low-wear screw structure of claim 1, wherein a third included angle is formed between the first side surface of each crushing rib and the outer peripheral surface of the first thread on the reaming part of the rod body, the third included angle being less than 90 degrees and greater than zero degree.

7. The low-wear screw structure of claim 1, wherein each crushing rib is provided with a ridge portion formed at a junction of the first side surface and the second side surface, the ridge portion having an arc shape in cross section.

8. The low-wear screw structure of claim 1, wherein a difference between the first included angle and the second included angle is greater than or equal to 5 degrees and less than or equal to 45 degrees.

9. The low-wear screw structure of claim 1, wherein the first thread has a first thread angle at the reaming part and the first thread has a second thread angle at the taper part, an angle of the first thread angle being different from an angle of the second thread angle.

10. The low-wear screw structure of claim 1, wherein each crushing rib is provided with a ridge portion provided with a plurality of peaks and a plurality of valleys which are alternately arranged so that the ridge portion is wavy.

* * * * *